(12) United States Patent
Niewiadomski et al.

(10) Patent No.: US 6,996,808 B1
(45) Date of Patent: Feb. 7, 2006

(54) FUNCTION INJECTOR

(75) Inventors: Jack Niewiadomski, Issaquah, WA (US); Lynn Qinlin Tang, Redmond, WA (US); A. S. Sivakumar, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/503,215

(22) Filed: Feb. 12, 2000

(51) Int. Cl.
*G06F 9/44* (2006.01)
*G06F 11/00* (2006.01)

(52) U.S. Cl. .......... 717/130; 717/131; 714/38
(58) Field of Classification Search ........ 717/130, 717/131; 714/38
See application file for complete search history.

(56) References Cited

U.S. PATENT DOCUMENTS

| | | | | |
|---|---|---|---|---|
| 5,481,706 A | * | 1/1996 | Peek | 710/200 |
| 5,528,753 A | * | 6/1996 | Fortin | 714/35 |
| 5,748,878 A | * | 5/1998 | Rees et al. | 717/130 |
| 5,764,883 A | * | 6/1998 | Satterfield et al. | 714/38 |
| 5,812,828 A | * | 9/1998 | Kaufer et al. | 703/22 |
| 5,819,094 A | * | 10/1998 | Sato et al. | 717/131 |
| 6,026,236 A | * | 2/2000 | Fortin et al. | 717/130 |
| 6,106,571 A | * | 8/2000 | Maxwell | 717/131 |
| 6,158,049 A | * | 12/2000 | Goodwin et al. | 717/158 |
| 6,161,200 A | * | 12/2000 | Rees et al. | 717/130 |
| 6,249,907 B1 | * | 6/2001 | Carter et al. | 717/130 |
| 6,311,327 B1 | * | 10/2001 | O'Brien et al. | 717/130 |
| 6,691,218 B2 | * | 2/2004 | Brown | 711/216 |
| 6,836,771 B2 | * | 12/2004 | Brown | 711/200 |

* cited by examiner

*Primary Examiner*—Tuan Dam
*Assistant Examiner*—Qamrun Nahar
(74) *Attorney, Agent, or Firm*—Merchant & Gould; John J. Farrell

(57) ABSTRACT

This invention provides a system and method for instrumenting an executable file by replacing an original function in the executable file with a user-supplied function and enabling the user-supplied function to invoke the original function. In particular, the executable file includes an access to the original function. To instrument the executable file, the access to the original function is replaced with an access to the user-supplied function. Access information associated with the original function is retained, which enables the user-supplied function to locate the original function.

35 Claims, 6 Drawing Sheets

FUNCTION INJECTOR

FIELD OF THE INVENTION

This invention relates generally to testing computer program code, and more particularly to invoking fault conditions during the testing of computer program code.

COPYRIGHT NOTICE/PERMISSION

A portion of the disclosure of this patent document contains material, which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright© 2000, Microsoft Corporation, All Rights Reserved.

BACKGROUND OF THE INVENTION

Computer programs have become increasingly more complex as they provide more and more features. As the complexity increases, the probability that a computer program will have a programming error (commonly referred to as a "bug") increases dramatically. To reduce the probability of distributing a computer program with a programming error, developers of computer program perform extensive testing. Because of the importance of thorough testing and because such testing can be very time-consuming, computer program developers have developed extensive testing procedures.

In order to make a computer program application reliable for its intended audience, whether that be a commercial distribution of thousands of copies as a major software product offering to the public at large, or internal use distribution, as a tool to a department sized work group of a dozen people or less, the area of software testing has emerged as the primary vehicle for assuring quality software products and for rooting out and resolving as many bugs as possible. In the field of testing, an attempt is made to exercise the software in as many different ways as possible in order to catch as many programming errors as possible before "releasing" the software for general use. Bugs not caught before release are very costly to an enterprise both in terms of rectifying the errors and in the loss of goodwill due to perceptions regarding the quality of the software.

Computer program code is tested using one of a number of conventional methods, including artificially simulating a fault condition by stepping through the executable file in a debugger and manually changing the instruction pointer or memory value, modifying the source code by introducing debug statements or routines into the program and observing the results during program execution, limiting system resources, writing replacement function libraries using user controllable settings, or intercepting functions at run-time and diverting control execution to a replacement function.

Another technique is redirecting a function, as in U.S. Pat. No. 5,812,828, in which a call to a function is replaced with a call to a user-supplied function. However, this technique suffers from the same drawback that all techniques that use a replacement function suffer from: the location, or entry point address, of the original redirected function is not retained, therefore, the original redirected function cannot be accessed. In this case, the original redirected function is merely simulated, the original redirected function is never used or accessed by the user-supplied function. This limits developers and testers in the testing of the function because the original function must often be used to exactly reproduce a fault.

SUMMARY OF THE INVENTION

In general, the invention enables an author of a computer program to easily inject a fault into an executable file. More specifically, the invention instruments an executable file so that an instrumented function call or method invocation is redirected to a user-supplied function, and the user-supplied function is able to invoke the instrumented function in the original context of stack and registers because the instrumented function address is saved in a table in the executable file. The invention also enables publication, or export, of a function that was not exported during compilation or linking, and enables the user-supplied function(s) to invoke the published function.

More specifically, the function lookup table maps or associates, the address of the original function with the name of the original function, when the executable file is instrumented. The instrumented code is modified such that the address of the instrumented function is saved in a threaded local storage (TLS) variable. Each user-supplied function that invokes the original instrumented function uses the name of the instrumented function to verify that the address in the TLS variable is the same as the address in the function lookup table. Upon verification, the user-supplied function invokes the instrumented function using the verified address. A LookupFunctionAddress( ) function retrieves the address of an instrumented function and a LookupMethodAddress( ) function retrieves the address of an instrumented object-oriented class method.

A master lookup table that maps the base addresses of the instrumented executable files to the address of the function lookup tables is created at runtime of the instrumented executable file by an injector runtime library that looks up the original function address. The injector runtime library that looks up the original function address is separate from the instrumented executable file. Furthermore, the injector runtime library that looks up the original function address executes at the same time as the instrumented executable file and a user-supplied function library.

In addition, the present invention enables logging of events for the purposes of statistical analysis or as data added to a software "bug" report, enables substitution of one library application program interface (API) for another API for purposes of proof-of-concept or hot-fix, and enables addition of functionality to an executable file without modifying the source code of executable file.

In one aspect of the present invention, a method for creating an instrumented executable file includes redirecting an original function in an executable file to a user-supplied function and retaining access information of the original function. During execution of an executable file, a user-supplied function invokes the original function using the retained access information of the original function. The original function in varying embodiments is embedded in the executable file or is in a dynamic link library (DLL). An embedded function is a function that physically resides in the same file that contains a main( ) function entry point. The method further enables the user-supplied function to invoke the original function by adding a call in the user-supplied function to a function that retrieves the retained address of the original function, by adding an invocation in the usersupplied-function that invokes the original function from the address of the original function.

Dynamic control of the user-supplied function and the original function is accomplished by adding set point management control functions to the user-supplied function that access one or more data files, such as an initialization (INI) file, to retrieve control and command information.

In another aspect of the present invention, a method for instrumenting a function imported into an executable file. The method includes adding a wrapper of the imported function to the import data block, and the method includes adding to the executable file, a stub function for the imported function that saves the original function address to a TLS variable and causes a jump to the user-supplied function. The method also includes adding to a function lookup table, an entry mapping the address of the original imported function to the name of the original imported function.

In yet another aspect of the invention, a method for instrumenting a function that is embedded in an executable file, includes modifying an embedded function to jump to the user-supplied function and adding an entry in a function lookup table of the original embedded function address.

In still another aspect of the present invention, a method for executing an instrumented executable file that calls an original function that jumps to a user-supplied function, the method includes determining whether the function implements a thiscall calling convention and if so, then injecting code to push the register that holds the 'this' pointer onto the stack from the called function site and swap the return value of a calling function on the stack and the ECX register value on the stack. The original function may be imported or embedded in the executable file.

In still yet another aspect of the invention, a computer system includes a first module of machine-readable code, such as an executable file that includes a instrumented function jump to a replacement (user-supplied) function and a data structure, such as a table associating the identity of the instrumented function with the location of the instrumented function, and includes a second module comprising the replacement (user-supplied) function, operatively coupled to the first module through an invocation of the original function.

In an additional aspect of the invention, a method for publishing a function that was not previously exported includes adding an entry describing the function in a function lookup table in a machine-readable executable file.

In a final aspect of the invention, set points enable a user-supplied wrapper function to be written once, and its functionality can be altered in various ways under the direction of data stored in a separate file, such as initialization file or registry. In being data driven, the user-supplied function does not need to be modified and recompiled in order to simulate a different fault. Furthermore, the present invention performs fault detection, in which the user-supplied function invokes the original instrumented function and afterward attempts to verify successful completion of the original function.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

The invention as embodied is a general purpose software product that can be incorporated into a specific test program designed to test a particular API, internal functions that are not intended to be utilized by anyone else but the developer, and all the subroutines therein. By including this embodiment of the invention into the test program, the writing of the test program is simplified and streamlined so as to save time and money with respect to test program development. In addition by not requiring the tester/developer to modify the original source code, potential new bugs/errors will not mistakenly be introduced.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of the invention is presented. In the third section, methods for an exemplary embodiment of the invention are provided. In the fourth section, a particular implementation of the invention is described. Finally, in the fifth section, a conclusion of the detailed description is provided.

Hardware and Operating Environment

Figure 1:
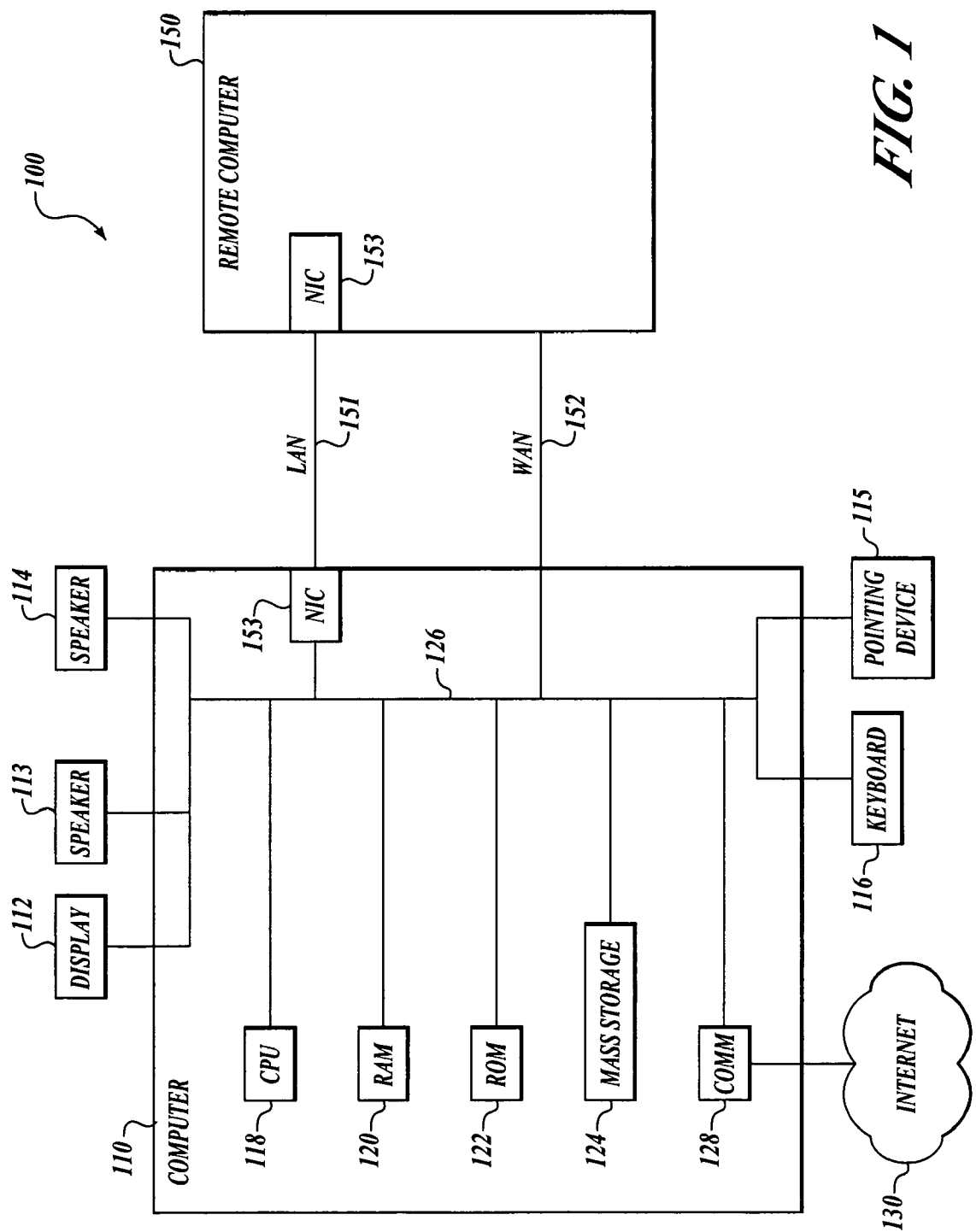
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

A system level overview of the operation of an exemplary embodiment of the invention is described by reference to FIG. 2.

System 200 includes an instrumented executable file 210 that is modified from an original module (not shown) to replace, substitute or instrument access 220 to an original function 230, with an access 240 to a user-supplied function 250. The user-supplied function 250 optionally includes an access mechanism 260 to the original function 230. The user-supplied function 250 is alternatively described as a "wrapper" when the user-supplied function 250 optionally "wraps" or includes access to the original function 230.

More specifically, the original function 230 and the user-supplied function 250 in varying embodiments are functions or object methods.

In one embodiment, instrumented executable file 210 is instrumented in a manner such that an original function 230 that is contained or embedded within the instrumented executable file 210 (not shown) includes an invocation or redirection 260 to a user-supplied function 250.

System 200 enables instrumenting an original function 230 in an executable file using a user-supplied function 250, in a manner that enables the user-supplied function 250 to invoke the original function 230, regardless of whether the original function 230 is imported from a dynamic link library is implemented in the executable file 210.

System 200 also includes a mechanism to retain information required to access the original function. In one embodiment, the mechanism is a table 270 in the instrumented executable file 210 that maps or associates the name of the original function 230 with the address of the original function 230. The mechanism enables the user-supplied function 250 to locate the original function 230. The table 270 is described in detail in conjunction with FIG. 6.

Optionally, system 200 includes an injector runtime library 280. At initialization of the run time library, a master lookup table 290 is created, that relates the base address of the instrumented executable file 210 to the address of the lookup table of the instrumented executable file. The master lookup table 290 assists in locating the address of the lookup table of instrumented executable program.

The system level overview of the operation of an exemplary embodiment of the invention has been described in this section of the detailed description. The system level overview describes a system for enabling an instrumented executable file to retain access information, such as the entry point address, of an instrumented executable file so that a user-supplied function can access the original function. The invention is not limited to any particular implementation of instrumented executable file or component.

Methods of an Exemplary Embodiment of the Invention

In the previous section, a system level overview of the operation of an exemplary embodiment of the invention was described. In this section, the particular methods performed by the server and the clients of such an exemplary embodiment are described by reference to a series of flowcharts. The methods to be performed by the clients constitute computer programs made up of computer-executable instructions. Describing the methods by reference to a flowchart enables one skilled in the art to develop such programs including such instructions to carry out the methods on suitable computerized clients (the processor of the clients executing the instructions from computer-readable media). Similarly, the methods to be performed by the server constitute computer programs also made up of computer-executable instructions. Describing the methods by reference to flowcharts enables one skilled in the art to develop programs including instructions to carry out the methods on a suitable computerized server (the processor of the clients executing the instructions from computer-readable media).

Figure 3:
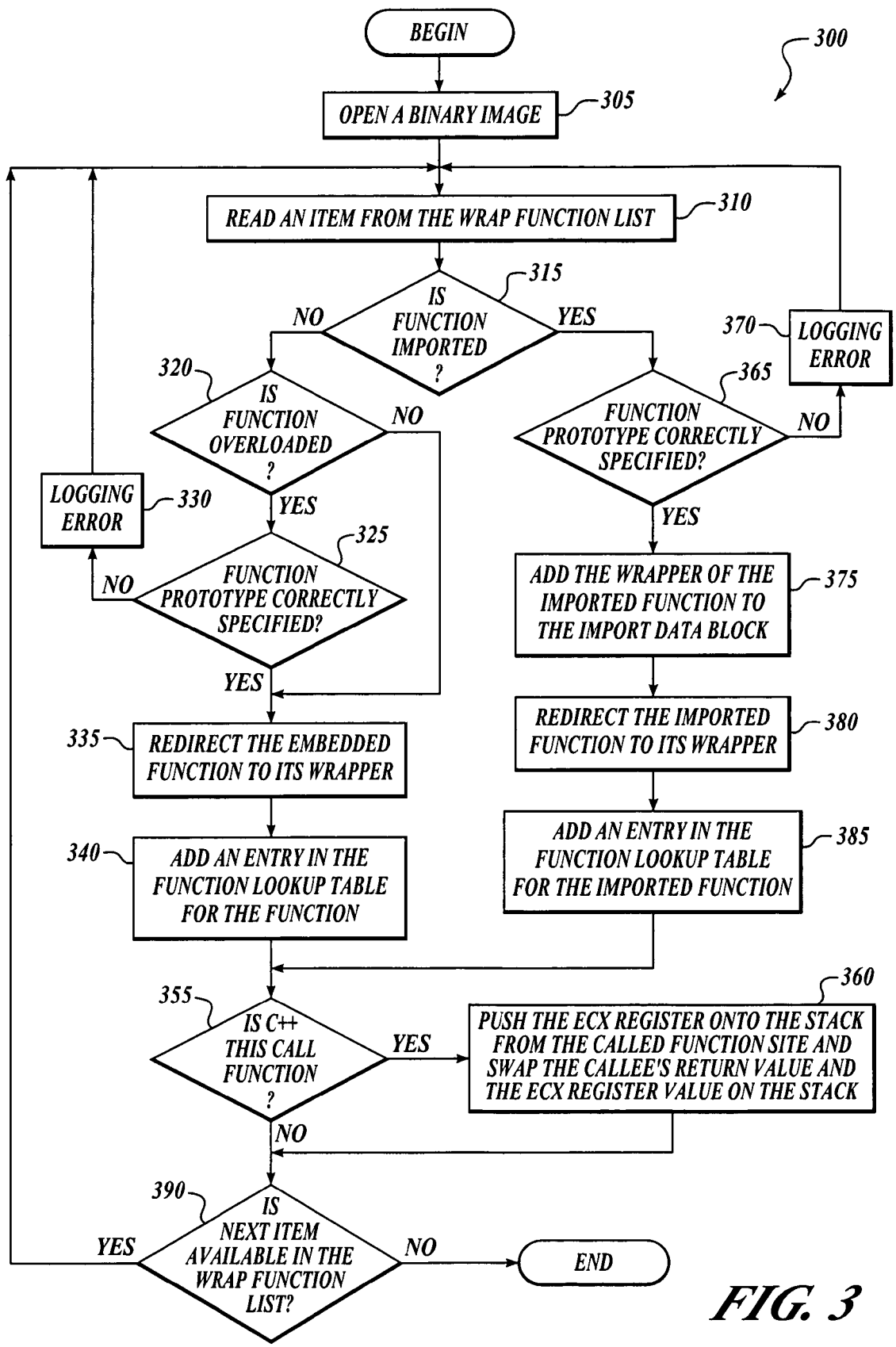
FIG. 3 is a flowchart of a method of instrumenting a function in an executable file with a user-supplied function in a manner that preserves access information of the instrumented function, to be performed by a computer according to an exemplary embodiment of the invention.

FIG. 3 is a flowchart of a method of instrumenting a function in an executable file with a user-supplied function in a manner that preserves access information of the instrumented function, to be performed by a computer, according to an exemplary embodiment of the invention.

Method 300 begins by opening a binary image of an executable file to be instrumented 305. A list (not shown) of the function(s) in the executable file that are to be instrumented, known as a "wrap function list" is also specified. Thereafter, each of the functions identified in the wrap function list are instrumented.

To instrument each of the functions identified in the wrap function list, the next entry in the wrap function list is retrieved 310. Thereafter, the list of procedures/functions is enumerated and a determination of whether or not the function exists is made (not shown). If the function does not exist, then the method continues at action 310, where the next item from the wrap function list is retrieved.

Continuing, a determination is made as to whether the retrieved function is imported or not 315.

In one embodiment, the determination is based on the .IDATA (import data) table present in an executable file of the portable executable (PE) file format. If the function name is found in the .IDATA table, it is imported from the specified module. If the function name is not found in the import table, the function exists within the executable file. The tool DUMPBIN in Microsoft VisualStudio can be used to display the list of imported functions.

If the determination indicates the function is not imported, the function is instrumented pursuant and according to the requirements of an embedded, internal, local, or defined, function. Otherwise, the function is instrumented pursuant and according to the requirements of an imported function. In one embodiment, an imported function is a function that is located, or resides outside of the executable file being instrumented, such as a dynamic link library (DLL).

Instrumenting an embedded function begins with determining if the function is overloaded 320. An overloaded function is well-known to those skilled in the art as having the same name as of at least one other function within the same scope or domain, but with a different set of arguments or parameters. If the function is overloaded, a determination is made as to whether the function prototype of the function retrieved in action 310 is correctly specified 325. If the function prototype is not correctly specified, then the error is logged or recorded 330 and the instrumenting of the function that was retrieved from the function wrapper in action 310 is aborted by returning control flow to action 310 in order to instrument the next function in the function wrapper list. If the function is not overloaded, or if the function is overloaded and the prototype of the function is correctly specified, then instrumenting of the embedded function continues by redirecting the original embedded function in the executable file to the user-supplied function 335. More specifically, the redirection 335 is performed by modifying the original function, such that the address of the original function is saved into the threaded local storage (TLS) variable. Subsequently, an instruction "JMP Wrapper_address" is added to the body of the original function. "Wrapper_address" is the user-supplied function to be redirected to. More specifically the instruction is an assembly "JMP" instruction.

Furthermore, the instrumented executable file does not need to be re-instrumented in order to change the behavior of the original function or the user-supplied function. Rather, in one embodiment, the behavior of the user-supplied function is altered using user-specified set points. The set points are stored in any data storage embodiment that is well-known to those skilled in the art, such as a registry file, an external file, the current system resource, and an initialization (INI) file. By being data driven, the user-specified wrapper function does not need to be modified and recompiled in order to simulate a different fault.

The method 300 also includes adding an entry in a function lookup table of the original module 340, which enables the user-supplied function to call the original function at run-time. The function lookup table is as in table 270 in FIG. 2.

Where an original function is a class method that uses the _thiscall calling convention, then the user-supplied function is prototyped or defined with an additional parameter, the "this" pointer which points to the object class, and method uses the _stdcall calling convention.

In one embodiment, if the original function is determined to be a C++ thiscall function 355, then code is generated and inserted in the original function that pushes the ECX register value onto the stack and swaps the return address of the calling function on the stack and the ECX register value on the stack. This code is necessary to provide a correct stack before the jump to the user-supplied function. More specifically, the swap is performed because at the time the ECX registry value is pushed on to the stack in the original function, the return address of the calling function is already on the stack. Therefore, the return address and the ECX register value are swapped so that the "this" pointer stored in ECX has the correct position on the stack.

In an alternative embodiment, if the original function is determined to use the thiscall calling convention, then action 360, pushing the register that holds the 'this' pointer onto the stack from the called function site and swapping the return value of the calling function on the stack and the ECX register value on the stack is performed.

The use of the ECX register is to support the "this" pointer in C++ implementations. Conventionally, all non-static class methods require a "this" pointer. The "this" pointer points to the start of the specific instance of the instantiated object (i.e. class, data structure). The compiler places the "this" pointer in the ECX register instead of pushing it on the stack as an optimization. There is a high probability that one method will call another method within the same class.

Instrumenting an imported user-supplied function begins with determining whether the function prototype of the user-supplied function retrieved in action 310 is correctly specified 365. In one embodiment, where the imported function was written in C++, then the function prototype is made available through the portable executable (PE) file format. In another embodiment where the imported function is written in a language other than C++, only the base function name is available. In yet another embodiment, the module DLL that hosts the imported function is searched for its prototype directly from the source.

If the function prototype is not correctly specified, then the error is logged or recorded 370, similar to action 330, and the instrumenting of the user-supplied function that was retrieved in action 310 ends by returning control flow to action 310 in order to instrument the next user-supplied function in the list.

If the prototype of the user-supplied function is correctly specified, then instrumenting of the imported function continues by adding the imported user-supplied function, or wrapper, to the import data block of the executable file 375. In one embodiment, an entry indicating the imported user-supplied function is added to the idata definitions in the executable file. The idata definitions identify imported functions.

Continuing the instrumenting of an imported function, method 300 redirects all calls of the original imported function in the executable file to the user-supplied function 380. More specifically, redirecting an imported function includes adding a wrapper of the imported function to the import data block (.IDATA) in the instrumented executable file, adding a stub function for the imported function to the instrumented executable file, and redirect calls of the original function to the stub function. The stub function includes an instruction that saves the original function address to a threaded local storage variable and an instruction that causes a jump, such as an assembly "JMP" instruction, to the user-supplied function.

The method also includes adding an entry in a function lookup table for the original imported function 385, which enables the user-supplied function to call the original function. The function lookup table is as in table 270 in FIG. 2.

If the original function is determined to be a C++ thiscall function 355, then code is generated and inserted in the stub function that pushes the ECX register value onto the stack and swaps the return address of the calling function on the stack and the ECX register value on the stack. This code is necessary to provide a correct stack before the jump to the user-supplied function. More specifically, the swap is performed because at the time the ECX registry value is pushed on to the stack in the original function, the return address of the calling function is already on the stack. Therefore, the return address and the ECX register value are swapped so that the "this" pointer stored in ECX has the correct position on the stack.

Actions 375, 380, and 385 are performed in varying order in varying embodiments.

Thereafter, if at least one additional entry remains in the wrap function list 390, the method 300 continues with action 310. Otherwise, the method 300 ends.

As a result, the instrumented executable file does not need to be re-instrumented in order to change the behavior of the original function. Rather, the behavior of the user-supplied function is altered using user-specified set points, as described below in conjunction with FIG. 5, via an external file, the registry, the current system resource, and other data sources well-known to those skilled in the art.

Optionally, method 300 also includes generating and adding code to a wrapper function that invokes a setpoint manager. However, the wrapper function author does not need to invoke a setpoint manager in order to implement the wrapper function. Using a set point manager, however, will allow the wrapper function author to leverage this data-driven model and not need to focus on managing set points.

Optionally, method 300 also includes generating and adding a call instruction to the instrumented executable file. At run-time, when the instrumented executable file is first executed, the call instruction will call a function to save in a master lookup table, such as master 290 in FIG. 2, the pointer or address of the instrumented executable file, as in table 270 in FIG. 2, in association with the name of the instrumented executable file. The function receives the pointer to the function lookup table of the instrumented executable file, as in table 270 in FIG. 2, and the base address pointer of the executable file. At run-time, the master lookup table, as in table 290 in FIG. 2, is accessed using the TLS value as the comparison criteria to retrieve the base address of the original instrumented executable file. Thereafter, the base address of the instrumented executable file is used to locate the function lookup table within the instrumented executable file, then the function lookup table, as in table 270 in FIG. 2, is accessed to retrieve the address of the original function.

Figure 2:
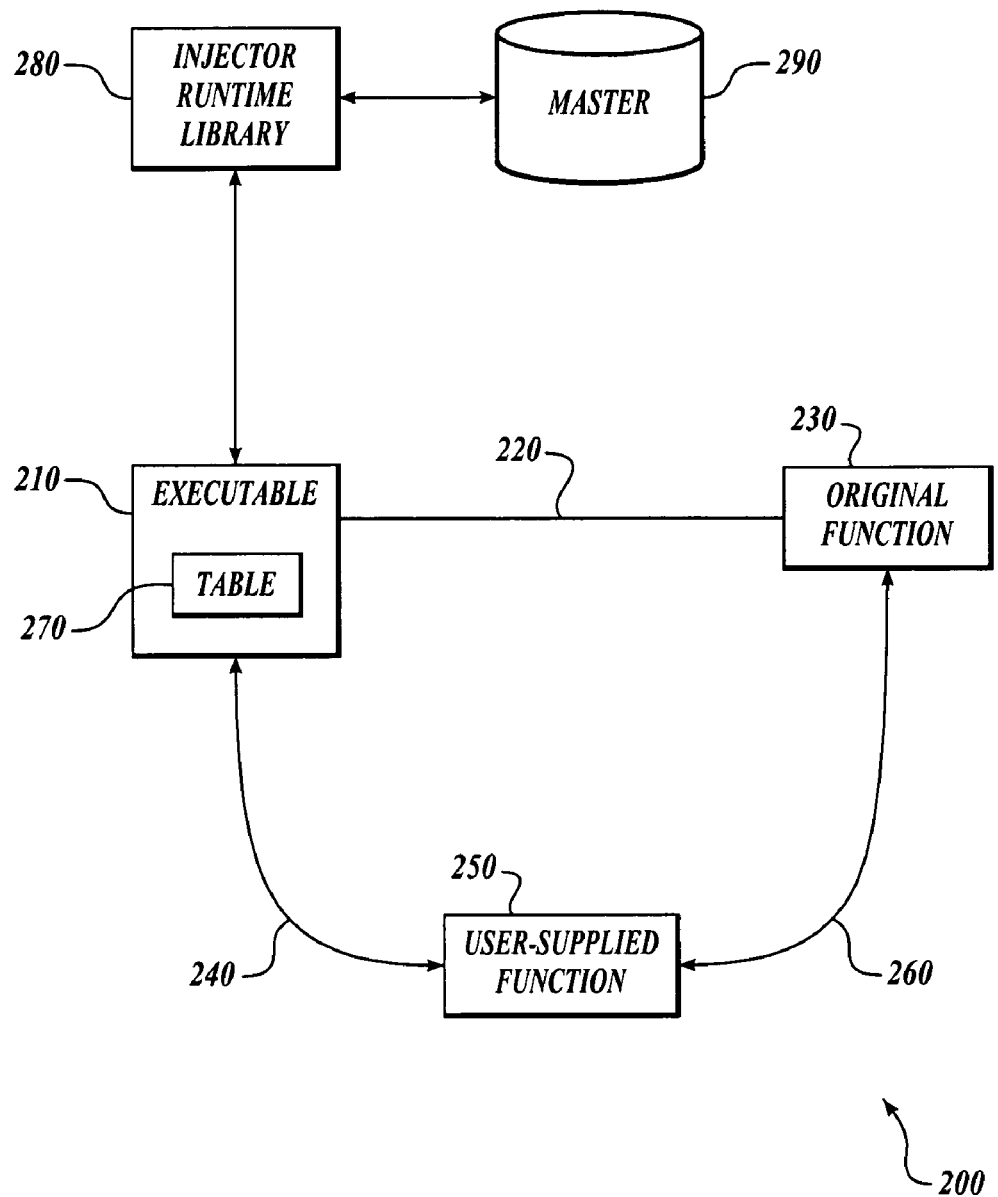
FIG. 2 is a diagram illustrating a system-level overview of an exemplary embodiment of the invention.

Optionally, method 300 also adds machine instructions to the executable file to call the SaveWrappedFunctionAddress( ) function to save the address of the original instrumented function in a global master lookup table, such as master 290 in FIG. 2. The LookupFunctionAddress( ) and LookupMethodAddresso functions verify that the address found in the function lookup table, as in table 270 in FIG. 2, matches this value.

At run-time, when the instrumented executable file is executed, a master lookup table is used to assist in locating the address of the original function. The method to find the original function address of a wrapped function is as follows: from the TLS variable, the run-time module can determine from the master lookup table, the base address of the module where the wrapped function resides. Then, the run-time module can locate the address of the function lookup table, as in table 2 in FIG. 2, from the master lookup table. From the function lookup table, the run-time module can match the function name with its original address.

Figure 4:
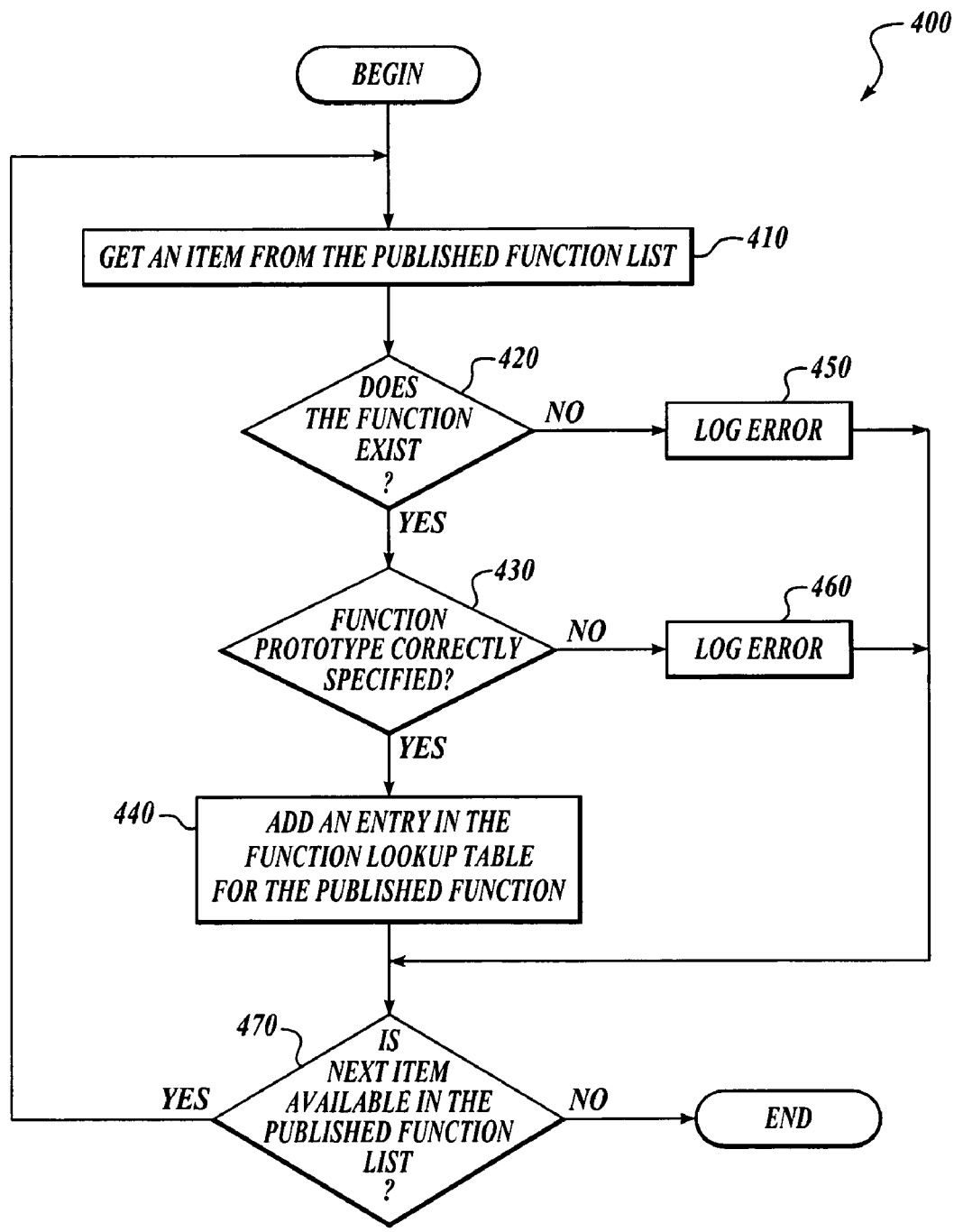
FIG. 4 is a flowchart of a method of publishing an instrumented function, to be performed by a computer according to an exemplary embodiment of the invention.

FIG. 4 is a flowchart of a method of publishing an instrumented function, to be performed by a computer according to an exemplary embodiment of the invention. Method 400 is optionally performed subsequent to method 300. The method enables a first function to be called from a second function after compilation and linking where the first function has not been exported by a linker or compiler.

Method 400 begins by retrieving an item from a list of functions that are to be published 410 that was not previously exported by the linker or compiler. Each item in the list uniquely identifies, by name and prototype, a function to be published. Thereafter, a determination of whether the function name exists 420 and a determination of whether the function prototype is correctly specified 430 is performed in order to verify that the function to be published exists. If the determinations succeed, then the function is published by adding the entry for the function in the function lookup table 440, as in action 340 and action 385 in FIG. 3. If the determinations fail, then the error is logged, 450 and 460, respectively. Continuing, the method 400 determines whether or not another item is available in the list 470. If another function is available, the method 400 continues by retrieving the function from the list in action 410. Otherwise, all of the functions that the list specifies for publishing are processed, and the method 400 ends.

Implementation

In this section of the detailed description, a particular implementation of the invention is described. The Implementation section is divided into 5 sections; instrumenting, overloaded functions and methods, set point management and run-time, fault simulation, and fault detection.

Instrumenting

Figure 5:
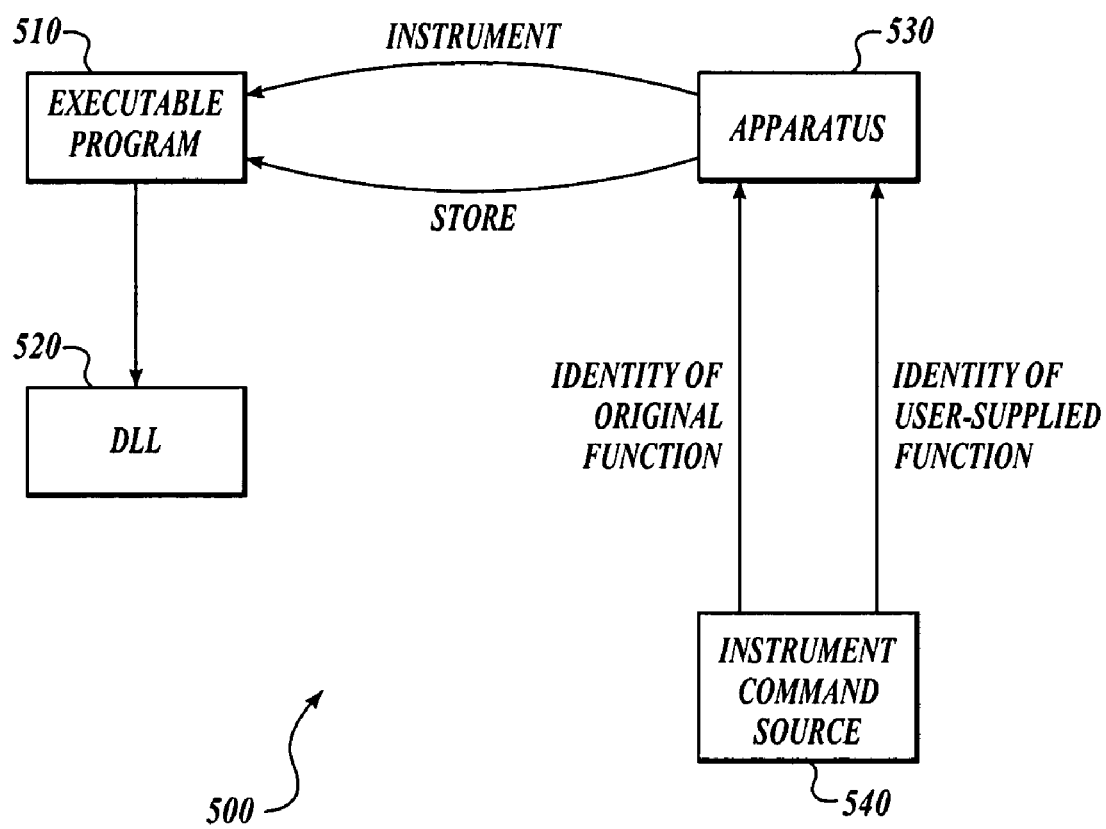
FIG. 5 is a block diagram of a system including an executable file, a software component having a user-supplied function, and an apparatus for instrumenting the executable file using the software component

FIG. 5 is a block diagram of a system 500 including an executable file, a software component having a user-supplied function, and an apparatus for instrumenting the executable file using the software component. System 510 includes an executable file 510, which has a machine-readable instruction that is a call to an original function that will be instrumented or a definition of an original function that will be instrumented. The source code of an example that is compiled and linked in the executable file 510 follows in table 1:

TABLE 1

```
void main (int argc, char * argv[ ])
{
        A(6);
        B(7);
};
void A(int z)
{
        return;
};
```

The source code in table 1 includes a function name "main ( )" which is the entry point of execution, and includes calls to functions A( ) and B( ). The functions in the program that are instrumented are the original functions before instrumenting, and have a unique identity, which includes a name, such as "A" and a parameter, such as "int z".

Executable file 510 is operatively coupled to a dynamic link library (DLL) 520 through compiling and linking operations performed on the executable file 510 and the DLL 520. The DLL 520 is comprised of one of more functions, such as the following in Table 2:

TABLE 2

```
void B(int x)
{
        return;
};
```

The system 500 also includes apparatus 530, which is a program that performs methods of instrumenting and publishing function(s) according to the present invention, as in method 300 and method 400, respectively. The apparatus 530 receives from a source of instrument commands 540, the identity, such as "void A(int z)", or "void B(int x)" of the original function in the executable file that is to be instrumented, and the identity, such as "void A_W(int z)", of a user-supplied function (not shown), as in action 310 in FIG. 3. In one embodiment, the source of instrument commands 540 is a data file, where the data file is created by a program that solicits instrumentation commands from users.

Furthermore, apparatus 530 instruments a function in the executable file. Instrumenting uses the identity of a user-supplied function and the identity of an original function received from the source of instrument commands 540.

For example, to instrument embedded function A( ) in Table 1 with user-supplied function A_W( ), A( ) in Main( ) is modified by adding a save of the address of A( ) in a TLS variable, adding an invocation of A_W( ) and as follows in Table 3:

TABLE 3

```
void main (int argc, char * argv[ ])
{
        A(6);
        B(7);
};
void A(int z)
{
        TLS_var=&A;
        jmp A_W;
        return;
};
```

Instrumenting an embedded function is also described in conjunction with actions 330 through 360 in FIG. 3.

In another example, to instrument calls in Table 1 to imported function B( ) with user-supplied function B_W( ), the call to B( ) in Main( ) is replaced with a call a stub for B_W( ) as follows in Table 4:

TABLE 4

```
void main (int argc, char * argv[ ])
{
        A(6);
        stub_B(7);
};
void A(int z)
{
        return;
};
stub_B(int Y)
{
        TLS_var=&B;
        jpmB_W( );
}
```

Instrumenting an imported function is also described in conjunction with actions 365 and 385 in FIG. 3.

Apparatus 530 also stores the address of the original instrumented function in the executable file in association with the name of the original instrumented function, which enables the user-supplied function to call the original instrumented. Storing the address of the original instrumented function in the executable file is also described in conjunction with actions 340 and 385 in FIG. 3.

Figure 6:
FIG. 6 is a diagram of a function lookup table data structure for use in an exemplary implementation of the invention.

FIG. 6 is a diagram of a function lookup table 600 data structure for use in an exemplary implementation of the invention. The function lookup table is as in table 270 in FIG. 2.

In order to provide access of an original function to the user-supplied function, the user supplied function accesses the function lookup table 600. The user-supplied function will send the name of the original function and receive in return the address of the original function. Thereafter, the user-supplied function will use the address of the original function to invoke the original function.

The function lookup table data structure 600 includes at least one entry, represented in FIG. 600 by the rows, in which the address of the original instrumented function is associated with the address of the original instrumented function. For example, the name of the original function is stored in the first column and the address is stored in the second column of the function lookup table 600.

Function lookup table 600 retains access information of the original function to enable the user-specified function to access the original function. In one embodiment, function lookup table 600 is stored in the instructed executable file. In another embodiment, functions LookupFunctionAddress( ) and LookupMethodAddress( ) enable the user-supplied function to locate the original function address without knowing the location of the original function. Functions LookupFunctionAddress( ) and LookupMethodAddresso are supported or hosted by an injector runtime library, such as module 280 in FIG. 2, that executes during the execution of the instrumented executable file.

More specifically, where a user-supplied function B_W( ) that resides in a DLL replaces, or instruments, original function B( ) in the executable file, as in Table 4, the function B_W( ) will be modified as follows in Table 5 in order to accomplish a call to the original function that B_W( ) replaces:

TABLE 5

```
void (* b)(int);
{
        void (* b)(int);
        b=LookupFunctionAddress("B")
        b(z);
};
```

Overloaded Functions and Methods

Determining if the function is overloaded, as in action 320 in FIG. 3, in one embodiment is a simple name match. For example, in an executable file in which the source code was written in C++, a function name can be viewed as mangled or unmangled. Mangling is well-known to those skilled in the art as generating a unique name for each function that is used for compiling and linking purposes. If more than one function has the same name, it is considered to be overloaded. In order for the compiler to be able to unambiguously identify which is the appropriate function, the function arguments must differ in at least one way. For example, where four overloaded SetReturnValue methods exist as defined below:

void SetReturnValue(char const chReturnValue);

void SetReturnValue(int const nReturnValue);

void SetReturnValue(unsigned int const uReturnValue);

void SetReturnValue(void*const pReturnValue);

The unmangled names of all of the above functions are SetReturnValue. Each function differs only in the parameter list. The mangled name counterparts of these methods will consist of the base name, plus an encoding technique that specifies the number and types of method arguments. For example:

?SetReturnValue@CSetPointTrace@@QAEXD@Z

?SetReturnValue@CSetPointTrace@@QAEXH@Z

?SetReturnValue@CSetPointTrace@@QAEXI@Z

?SetReturnValue@CSetPointTrace@@QAEXQAX@Z

When instrumenting, the system will search for all functions containing the same base function name. If more than one has been found, it is known to be overloaded.

For an overloaded function, an attempt to find the match function in the executable file using the function name with its list of parameter types, will be performed. For an non-overloaded function, an attempt to find the match function in the binary using only the function name as the search key, will be preformed.

Set Point Management and Run-Time

Set point management enables fault simulation and dynamic control of the user-supplied function and the original function. Set point management is accomplished by adding set point management control functions to the user-supplied function. The control function accesses one or more data files, such as an initialization (INI) file, to retrieve control and command information. Enhancing a user-supplied function to include set point management is accomplished by invoking a set point management interface to determine if a set point management component indicates that a specified threshold has been reached. For example, a user-supplied function C_W( ) incorporates set point management as shown below in Table 6

TABLE 6

```
int C_W(int z)
{
        if (spm.triggered( ))
        {
                return error;
        }
        CLookup("C");
        return C(z);
};
```

The user-supplied function C_W in Table 6 invokes a set point management function component. "spm" and sends the message "triggered" in order to determine if the set point management component has reached a threshold value. If so, then an error is returned, otherwise, the address of the original function C( ) that C_W( ) replaced is invoked and the execution of C_W( ) ends.

The run-time module that hosts functions LookupFunctionAddress( ) and LookupMethodAddresso also manages a master lookup table, as in master 290 in FIG. 2. More specifically, the master lookup table maps the base addresses of the instrumented function lookup tables, as in table 270 in FIG. 2, to the names of the instrumented executable file. The master lookup table is created at runtime by the injector runtime library hosting the lookup function and method functions. In other words, a table that maps the base address of each instrumented executable file to the address of the function lookup table, as in table 270 in FIG. 2, of the associated instrumented executable file is created at runtime by the injector runtime library, as in injector runtime library 280, hosting the lookup function and method functions. The master lookup table is a global array that resides in the run-time DLL. Each entry of this master lookup table contains the base address of the instrumented binary and the address of the function lookup table that contains the original function address prior to being wrapped or instrumented.

Fault Simulation

Fault simulation is accomplished in the set point management component by determining is a threshold has been reached. The threshold is determined by specifications stored in an external data source, such as an initialization (.INI) file. Examples of thresholds are trigger every nth call, trigger over n calls, trigger every n bytes communicated, and trigger over n bytes communicates, sleep (i.e. pause) action, break into debugger, and trigger alert. Other specifications that the fault simulation data source contain a setting section of specification that is acted upon once at the beginning of execution, and includes a refresh interval and a random seed, (i.e. psuedo-random reproduction) specification, a global section of specifications that are applicable to all instrumented functions, a group section of specifications that identifies groups of instrumented functions and a local section of specifications that set specifications for individual instrument functions.

Fault Detection

Fault detection is implemented through a set point management function ControlDetectFault( ). A user-supplied function checks the return value of a call to the original function and verifies that it has succeeded. If it has not succeeded, the user-supplied function calls the FaultDetected( ) method, which, when activated, writes an entry into the current log stream and execute any predefined actions via action setpoints.

CONCLUSION

A method and system for instrumenting an original function in an executable file using a user-supplied function, in a manner that enables the user-supplied function to call the original function, regardless of whether the original function is imported from a dynamic link library or is contained within, embedded within, internal to, local in, or defined in the executable file has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to functions and methods is meant to include all of these environments. The term function is used to describe both functions in procedural design components, and methods in object-oriented design components. Therefore, it is manifestly intended that this invention be limited only by the following claims and equivalents thereof.

We claim:

1. A computerized method for creating an instrumented executable file, the method comprising:
    modifying an executable file to invoke a user-supplied function in place of an original function, the user-supplied function enabling fault simulation code to control execution of the original function;
    storing the address and the name of the original function in a function lookup table;
    mapping the name of the executable file to the address of the function lookup table;
    storing the name of the executable file, the address of the executable file and the address of the function lookup table in a master lookup table;
    retrieving the address of the function lookup table and the address of the executable file from the master lookup table;
    locating the function lookup table in the executable file using the address of the executable file;
    retrieving the address of the original function from the function lookup table-using the name of the original function; and
    invoking the original function using the address of the original function.

2. The computerized method for creating an instrumented executable file as in claim 1, wherein the user-supplied function is in a dynamic link library.

3. The computerized method for creating an instrumented executable file as in claim 1, wherein the user-supplied function is not exported during compilation.

4. The computerized method for creating an instrumented executable file as in claim 1, wherein the original function and the user-supplied function have identical prototypes.

5. The computerized method for creating an instrumented executable file as in claim 1, where the user-supplied function is stored in a module that is separate from the executable file.

6. The computerized method for creating an instrumented executable file as in claim 1, wherein modifying the executable file is performed using user-specified set points.

7. The computerized method for creating an instrumented executable file as in claim 6, wherein modifying the executable file further comprises determining whether the original function implements the thiscall calling convention, and when the determination is positive, adding instructions to the executable file to perform:

pushing the register that holds the 'this' pointer onto the stack from the invoked original function site when the determining indicates that the function implements a thiscall calling convention; and swapping the return value of the invoking original function on the stack and the register that holds the 'this' pointer value on the stack when the determining indicates that the function implements a thiscall calling convention.

8. The computerized method for creating an instrumented executable file as in claim 6, wherein modifying the executable file further comprises enabling the user-supplied function to invoke the original function in the executable file.

9. The computerized method for creating an instrumented executable file as in claim 8, wherein enabling the user-supplied function to invoke the original function in the executable file further comprises:

adding a jump in the user-supplied function to a function that retrieves the address of the original function; and adding a jump in the user-supplied-function that invokes the original function using the address of the original function.

10. The computerized method for creating an instrumented executable file as in claim 1, further comprising enabling the user-supplied function to alter behavior.

11. The computerized method for creating an instrumented executable file as in claim 10, wherein enabling the user-supplied function to alter behavior is performed in response to data.

12. The computerized method for creating an instrumented executable file as in claim 11, wherein the data is retrieved from an initialization file.

13. The computerized method for creating an instrumented executable file as in claim 1, wherein the retaining further comprises:

saving the address of the original function in a threaded local storage variable; and creating an entry in the function lookup table associating the address of the original function with the name of the original function, wherein the function lookup table is in the instrumented executable file.

14. A computerized method for executing an instrumented executable file comprising:

modifying the instrumented executable file to invoke a user-supplied function in place of an original function, the user-supplied function enabling fault simulation code to control execution of the original function, the user-supplied function having a jump to the original function;

saving the address and the name of the original function in a threaded local storage variable;

mapping the name of the instrumented executable file to the address of a function lookup table;

storing the name of the instrumented executable file, the address of the instrumented executable file and the address of the function lookup table in a master lookup table;

retrieving the address of the function lookup table and the address of the instrumented executable file from the master lookup table;

locating the function lookup table in the instrumented executable file using the address of the instrumented executable file;

retrieving the address of the original function from the threaded local storage variable using the name of the original function; and invoking the user-supplied function using the address of the original function.

15. The computerized method for executing an instrumented executable file as in claim 14, further comprising creating the master lookup table at initialization wherein the master lookup table associates the address of the instrumented executable file to the address of a function lookup table in the instrumented executable file.

16. The computerized method for executing an instrumented executable file as in claim 14:

wherein original function is in a dynamic link library; and wherein the saving and the invoking is performed by a stub function of the original function, the stub function being located in the instrumented executable file.

17. The computerized method for executing an instrumented executable file as in claim 14:

wherein original function is embedded in the instrumented executable file; and wherein the saving and the invoking is performed by the original function.

18. The computerized method for executing an instrumented executable file as in claim 14, further comprising invoking the original function from within the user-supplied function using the threaded local storage variable.

19. The computerized method for executing an instrumented executable file as in claim 18, wherein invoking the original function further comprises:

pushing the register that holds the 'this' pointer onto the stack from the invoked original function site when the determining indicates that the function implements a thiscall calling convention; and swapping the return value of the invoking original function on the stack and the register that holds the 'this' pointer value on the stack when the determining indicates that the function implements a thiscall calling convention.

20. A computerized method for instrumenting an imported function in an executable file for testing by callers of the imported function, the method comprising:

adding a wrapper of the imported function to an import data block;

adding a stub function for the imported function wherein the stub function comprises an instruction that saves the address of the imported function to a threaded local storage variable and replaces an access to the imported function with an access to a user-supplied function, the user-supplied function enabling fault simulation code to control execution of the stub function;

adding an entry in a function lookup table associated with the imported function, wherein the entry comprises the address and the name of the imported function;

mapping the name of the executable file to the address of the function lookup table:

storing the name of the executable file, the address of the executable file and the address of the function lookup table in a master lookup table;

retrieving the address of the function lockup table and the address of the executable file from the master lookup table;

locating the function lookup table in the executable file using the address of the executable file;

retrieving the address of the imported function from the threaded local storage variable using the name of the imported function; and invoking the imported function using the address of the imported function.

21. The computerized method for instrumenting an imported function in an executable file as in claim 20, the method further comprising:
determining if the prototype of the imported function is correctly specified; and
indicating an error when the determining indicates an incorrectly specified prototype of the imported function.

22. A computerized method for instrumenting an embedded function in an executable file for testing by callers of the embedded function, the method comprising:
modifying the embedded function to invoke a user-supplied function in place of the embedded function using a wrapper, the user-supplied function enabling fault simulation code to control execution of the embedded function;
adding an entry in a function lookup table, wherein the entry comprises address and the name of the embedded function;
mapping the name of the embedded function to the address of the function lookup table;
storing the name of the embedded function, the address of the embedded function and the address of the function lookup table in a master lookup table;
retrieving the address of the function lookup table and the address of the embedded function from the master lookup table;
locating the function lookup table in the executable file using the address of the embedded function;
retrieving the entry from the function lookup table using the name of the embedded function; and
invoking the embedded function using the entry.

23. A computerized method for instrumenting an embedded function in an executable file as in claim 22, wherein the modified embedded function comprises an instruction that causes a jump to the user-supplied function.

24. A computerized method for instrumenting an embedded function in an executable file as in claim 22, the method further comprising:
determining whether the prototype of the embedded function is correctly specified; and
indicating an error when the determining whether the prototype of the embedded function is correctly specified indicates an incorrectly specified prototype of the embedded function.

25. A computerized method for instrumenting an embedded function in an executable file as in claim 22, wherein the function lookup table is in the executable file.

26. A computerized system comprising:
means for modifying an executable file to invoke a user-supplied function in place of an original function, the user-supplied function enabling fault simulation code to control execution of the original function;
means for storing the address and the name of the original function in a function lookup table;
means for mapping the name of the executable file to the address of the function lookup table;
means for storing the name of the executable file, the address of the executable file and the address of the function lookup table in a master lookup table;
means for retrieving the address of the function lookup table and the address of the executable file from the master lookup table;
means for locating the function lookup table in the executable file using the address of the executable file;

means for retrieving the address of the original function from the function lookup table using the name of the original function; and
means for invoking the original function using the address of the original function.

27. A computerized system comprising:
an executable file having a call to an original function, the original function having an identity comprising a name and a parameter prototype;
means for modifying the executable file to invoke a user-supplied function in place of an original function, the user-supplied function enabling fault simulation code to control execution of the original function;
means for storing the address and the name of the original function in a function lookup table;
means for mapping the name of the executable file to the address of the function lookup table;
means for storing the name of the executable file, the address of the executable file and the address of the function lookup table in a master lookup table;
means for retrieving the address of the function lookup table and the address of the executable file from the master lookup table;
means for locating the function lookup table in the executable file using the address of the executable file;
means for configuring the user-supplied function to retrieve the address of of the original function using the name of the original function;
means for invoking the original function using the address of the original function.

28. A computerized system comprising:
an executable file having a jump to an original function, the original function having an identity comprising a name and a parameter prototype;
a first software component having a user-supplied function that includes a jump to the original function; and
a second software component for:
receiving the identity of the original function;
receiving the identity of the user-supplied function;
instrumenting the executable file by modifying the executable file to invoke the identity of the user-supplied function in place of the identity of the original function, the identity of the user-supplied function enabling fault simulation code to control execution of the original function;
storing address and the name of the original function in a function lookup table in the executable file;
mapping the name of the executable file to the address of the function lookup table;
storing the name of the executable file, the address of the executable file and the address of the function lookup table in a master lookup table;
retrieving the address of the function lookup table and the address of the executable file from the master lookup table;
locating the function lookup table in the executable file using the address of the executable file;
retrieving the address of the original function from the function lookup table using the name of the original function; and
invoking the original function using the address of the original function.

29. A computerized system comprising:
a first module of machine-readable code comprising:
a call to an original function, the call being directed to a user-supplied function; and a first data structure associating the identity of the original function with the location of the original function, wherein the first module is configured to:
store the first data structure in a function lookup table,
map the identity of the first module to the location of the function lookup table,
store the identity of the first module, the location of the executable file and the location of the function lookup table in a master lookup table; and
a second module of machine-readable code comprising the user-supplied function linked to the first module and a jump to the original function, the user-supplied function enabling fault simulation code to control execution of the original function, wherein the second module is configured to:
retrieve the location of the function lookup table and the location of the first module from the master lookup table,
locate the function lookup table in the first module using the location of the first module,
retrieve the location of the original function from the function look up table using the identity of the original function, and
invoke the original function using the location of the original function.

30. The computerized system as in claim 29,
wherein the first data structure comprises the function lookup table, wherein the function lookup table is arranged to verify that a threaded local storage variable contains the correct address for the original function; and
wherein the second module comprises a dynamic linked library.

31. A computer-readable medium having computer-executable instructions to cause a computer to perform a method comprising:
modifying an executable file to invoke a user-supplied function in place of an original function, the user-supplied function enabling fault simulation code to control execution of the original function;
storing the address and the name of the original function in a function lookup table;
mapping the name of the executable file to the address of the function lookup table;
storing the name of the executable file, the address of the executable file and the address of the function lookup table in a master lookup table;
retrieving the address of the function lookup table and the address of the executable file from the master lookup table;
locating the function lookup table in the executable file using the address of the executable file;
retrieving the address of the original function from the function lookup table using the name of the original function; and
invoking the original function using the address of the original function.

32. A computer-implemented method for configuring an executable file, the executable file having an access to an original function, the computer-implemented method comprising:
replacing the access to the original function, with an access to a user-supplied function, the user-supplied function enabling fault simulation code to control execution of the original function;
storing the address and the name the original function in a function lookup table,
mapping the name of the executable file to the address of the function lookup table;
storing the name of the executable file, the address of the executable file and the address of the function lookup table in a master lookup table;
retrieving the address of the function lookup table and the address of the executable file from the master lookup table;
locating the function lookup table in the executable file using the address of the executable file;
retrieving the address of the original function from the function lookup table using the name of the original function; and
invoking the original function using the address of the original function.

33. The computer-implemented method of claim 32, further comprising configuring the user-supplied function to invoke the original function using the address of the original function.

34. The computer-implemented method of claim 32, wherein replacing the access to the original function with the access to the user-supplied function is performed by modifying the executable file.

35. The computer-implemented method of claim 32, wherein replacing the access to the original function with the access to the user-supplied function is performed by modifying set points stored in a computer-readable medium separate from the executable file.

* * * * *

UNITED STATES PATENT AND TRADEMARK OFFICE
CERTIFICATE OF CORRECTION

PATENT NO. : 6,996,808 B1
APPLICATION NO. : 09/503215
DATED : February 7, 2006
INVENTOR(S) : Jack Niewiadomski et al.

It is certified that error appears in the above-identified patent and that said Letters Patent is hereby corrected as shown below:

In column 4, line 28, after "component" insert -- ; --.

In column 7, line 27, delete "run time" and insert -- run-time --, therefor.

In column 9, line 29, delete "'this'" and insert -- "this" --, therefor.

In column 11, line 6, delete "LookupMethodAddresso" and insert
-- LookupMethodAddress() --, therefor.

In column 11, line 61, after "System" delete "510" and insert -- 500 --, therefor.

In column 13, line 36, delete "user supplied" and insert -- user-supplied --, therefor.

In column 13, line 58, delete "LookupMethodAddresso" and insert
-- LookupMethodAddress() --, therefor.

In column 14, line 67, after "Table 6" insert -- : --.

In column 15, line 14, delete "component." and insert -- component --, therefor.

In column 15, line 21, delete "LookupMethodAddresso" and insert
-- LookupMethodAddress() --, therefor.

In column 15, line 52, delete "psuedo-random" and insert -- pseudo-random --, therefor.

In column 18, line 56, in Claim 20, after "table" delete ":" and insert -- ; --, therefor.

In column 18, line 60, in Claim 20, delete "lockup" and insert -- lookup --, therefor.

In column 19, line 20, in Claim 22, after "comprises" insert -- the --.

In column 20, line 27, in Claim 27, delete "of" before "the". (Second Occurrence)

In column 21, line 22, in Claim 29, delete "look up" and insert -- lookup --, therefor.

In column 22, line 13, in Claim 32, delete "function," and insert -- function --, therefor.

UNITED STATES PATENT AND TRADEMARK OFFICE
CERTIFICATE OF CORRECTION

PATENT NO. : 6,996,808 B1
APPLICATION NO. : 09/503215
DATED : February 7, 2006
INVENTOR(S) : Jack Niewiadomski et al.

It is certified that error appears in the above-identified patent and that said Letters Patent is hereby corrected as shown below:

In column 22, line 18, in Claim 32, after "table" delete "," and insert -- ; --, therefor.

Signed and Sealed this

Twenty-eighth Day of July, 2009

JOHN DOLL
*Acting Director of the United States Patent and Trademark Office*